(12) United States Patent
Ogilvie (10) Patent No.: US 7,577,604 B2
(45) Date of Patent: *Aug. 18, 2009

(54) PROMOTING SAVINGS BY FACILITATING INCREMENTAL COMMITMENTS MADE WITH CREDIT CARD AND OTHER CONSUMER-INITIATED TRANSACTIONS

(75) Inventor: John W. L. Ogilvie, Salt Lake City, UT (US)

(73) Assignee: Vesdia Corporation, Atlanta, GA (US)

( * ) Notice: Subject to any disclaimer, the term of this patent is extended or adjusted under 35 U.S.C. 154(b) by 1182 days.

This patent is subject to a terminal disclaimer.

(21) Appl. No.: 10/645,336

(22) Filed: Aug. 21, 2003

(65) Prior Publication Data
US 2005/0038740 A1    Feb. 17, 2005

Related U.S. Application Data

(63) Continuation of application No. 09/472,658, filed on Dec. 27, 1999, now Pat. No. 6,631,358.

(60) Provisional application No. 60/164,901, filed on Nov. 11, 1999.

(51) Int. Cl.
*G06Q 40/00* (2006.01)
(52) U.S. Cl. .......................... 705/37; 705/35
(58) Field of Classification Search ................... 705/37, 705/35
See application file for complete search history.

(56) References Cited

U.S. PATENT DOCUMENTS

| | | | | |
|---|---|---|---|---|
| 5,297,026 A | * | 3/1994 | Hoffman | 705/14 |
| 5,787,404 A | * | 7/1998 | Fernandez-Holmann | 705/35 |
| 6,070,153 A | * | 5/2000 | Simpson | 705/36 R |
| 6,105,865 A | * | 8/2000 | Hardesty | 235/380 |
| 6,112,191 A | * | 8/2000 | Burke | 705/41 |

* cited by examiner

*Primary Examiner*—Jagdish N Patel
(74) *Attorney, Agent, or Firm*—Alston & Bird LLP (57) ABSTRACT

The present invention provides tools and techniques for directing funds on behalf of a consumer to a specified account as a beneficial side-effect of a transaction that is primarily directed toward another goal, such as the purchase of merchandise or services. For instance, when the consumer purchases goods with a specified credit card, one version of the invention automatically directs an incremental amount to savings on behalf of the consumer, pursuant to an agreement previously made between the consumer and a facilitator. Under such an agreement, a specified percentage of the transaction or a flat amount per transaction is directed to a savings account, a mutual fund account, or another savings vehicle. The benefited savings vehicle is not necessarily owned by the consumer. The directed funds may be deposited on an annual basis, a threshold basis, or a one-deposit-per-transaction basis. Other variations are also described.

18 Claims, 5 Drawing Sheets

PROMOTING SAVINGS BY FACILITATING INCREMENTAL COMMITMENTS MADE WITH CREDIT CARD AND OTHER CONSUMER-INITIATED TRANSACTIONS

RELATED APPLICATIONS

This application is a continuation of U.S. patent application Ser. No. 09/472,658 filed Dec. 27, 1999, which is a non-provisional of provisional application Ser. No. 60/164,901 filed Nov. 11, 1999.

FIELD OF THE INVENTION

The present invention relates to tools and techniques for promoting consumer savings, and relates more particularly to technical improvements and business methods which allow consumers to automatically and incrementally set aside savings when using a credit card or other computer-assisted payment mechanism.

TECHNICAL BACKGROUND OF THE INVENTION

Consumers who wish to place part of their hard-earned money in savings accounts face psychological hurdles, in addition to the inherent economic hurdles. It is difficult to set aside funds for savings when so many other uses compete for those funds, and even more difficult to do so consistently.

One technique used to promote consumer savings is the automatic payroll deduction. Consumers employed by a business that provides such a plan can have a specified amount or specified percentage automatically deducted from their regular paycheck, to be placed in a savings account such as an IRA, KEOGH, 401(k), stock purchase plan, or the like. This has the advantage of making it psychologically easier, at least for some people, to consistently set aside funds in some type of savings account. However, not every employer offers such a savings plan, and self-employed persons must also use some other approach.

Savings may also be promoted to some extent by having "extra" money withheld by an employer to increase the likelihood of receiving a tax refund. However, even if a refund is made, it will not necessarily be placed in savings. Moreover, providing the government with a zero-interest loan is often not the best use of one's funds before the refund is granted.

One credit card, the Discover® card, offers a Cashback Bonus® service whereby the consumer receives a check at the end of a given year for an amount which varies depending on the purchases made during the year using the card. Like tax refunds and other "windfalls," the Discover® card funds will not necessarily be placed in savings, and the consumer apparently does not receive interest for use of the funds in question by the card issuer or other institution prior to the time the check is cashed by the consumer.

Another credit card, the Principal Bank VISA card, offers a cash back rewards program whereby the consumer's cash back "reward" may be applied toward one of the following Principal products: contributions to a Principal mutual fund; principal payment on a Principal consumer loan; principal payment on a Principal mortgage loan; deposit in a Principal bank deposit account such as a certificate of deposit, savings account, or money market account; contribution to a Principal variable annuity contract; or contribution to a Principal variable life contract. The reward can be selected by the consumer in an application for the Principal Bank VISA card. A Principal representative indicated to the inventor in a telephone conversation on or after Nov. 13, 1999 that the Principal program pays the reward each time the amount of unpaid reward reaches a threshold, such as $100.

By using an unpaid reward threshold rather paying rewards annually, the Principal program helps consumers by decreasing the extent to which consumer funds are not put to work in a savings account on behalf of the consumer. The Principal program also makes it easier for users of the Principal Bank VISA card to incrementally and automatically make deposits to a Principal savings account, Principal certificate of deposit, Principal mutual fund, or other Principal vehicle.

However, in the currently known Principal program the available savings vehicles are limited to those provided by the credit card issuer, namely, Principal Bank. For instance, a consumer who owns a savings account at a bank outside the Principal Financial Group apparently cannot automatically and incrementally send funds to that account when using the Principal VISA card.

The known Principal program also limits the reward to at most a single savings vehicle. For instance, suppose a consumer has two children, has a savings account for each child, and wants to automatically and incrementally make two deposits (one to each savings account) each time the consumer makes a credit card payment. The Principal program apparently does not allow this.

Moreover, the known Principal program is limited to credit cards. Indeed, on its face it is limited to VISA credit cards issued by Principal Bank. Other credit cards, smart cards, charge cards, debit cards, electronic currencies, and other consumer alternatives to cash are apparently not supported.

Finally, the consumer cannot specify the size of the reward relative to card transaction(s). Instead, the reward is apparently fixed at a percentage which is selected by Principal Bank.

Accordingly, there is room for new tools and techniques to help a consumer easily and consistently set aside funds to be deposited in savings accounts, in mutual funds, as loan payments, and otherwise in savings vehicles when the consumer makes a purchase or a payment using a computer-assisted alternative to cash.

BRIEF SUMMARY OF THE INVENTION

The present invention relates to methods, articles, signals, and systems for facilitating savings. For instance, some embodiments allow consumers to set aside for their savings account(s) a specified amount or a specified percentage of a given transaction, when the transaction would otherwise not involve the savings account(s). The invention permits savings to occur as a beneficial side-effect of the consumer's normal financial activity. The main purpose of a given transaction will normally be to purchase or pay for goods and/or services which are unrelated to the present invention. As a side-effect, however, a portion of the funds charged or received during the transaction will be directed to the consumer's savings account or another savings vehicle. The transaction may include credit card use, charge card use, debit card use, smart card use, ATM or bank card use, prepaid card use, use of online or electronic money, other electronic funds transfers, and/or similar transactions.

Unlike automatic payroll deduction, the invention can be made readily available to many people, regardless of their employer's savings programs or self-employment status. Unlike tax refunds and Discover® card checks, funds specified under the invention will normally be directed to savings. Unlike rewards provided under the current Principal VISA card program, the funds may be directed to one or more savings accounts at various financial institutions, the funds may be deposited regardless of a "rewards" threshold, and/or the funds may be sent in response to smart card transactions, electronic check payments, and other transactions which do not require a credit card.

Instead of making a conscious effort specifically directed to putting funds in a savings vehicle, one need do little or nothing to place them there after the inventive infrastructure is in place. The invention can be used to place funds for a given consumer in one or more savings accounts of various types, including standard bank or credit union interest-bearing savings accounts, certificate of deposit accounts, IRAs and other tax-deferred or tax-free accounts, mutual fund accounts, stocks, bonds, loans, and so on.

Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention pertains generally to tools and techniques which allow a consumer to easily and incrementally add funds to one or more savings accounts, mutual funds, or other savings vehicles by setting funds aside as a side-effect of otherwise unrelated commercial transactions. For instance, suppose the consumer visits (in person or online) a merchant, selects some merchandise, and authorizes the merchant to charge the price of the merchandise to a particular credit card. In and of itself, this is a routine and conventional transaction which provides no benefit to a consumer's saving plans, unless the consumer happens to be using the Principal VISA card after specifying a Principal savings vehicle.

With the invention, incremental savings deposits can be made as a side effect of this transaction. This may be accomplished in various ways. For instance, the consumer may have an agreement with the consumer's credit card issuer whereby, as a result of the transaction, the consumer's credit card bill reflects not only the merchandise charge but also an incremental savings deposit charge. When the credit card bill is paid by the consumer, the card issuer will automatically deposit the incremental savings deposit portion of the payment in the consumer's savings account.

Note that the benefited savings account is not necessarily one provided to the consumer by the card issuer, but may instead be provided through some other financial institution. Likewise, the benefited savings account is not necessarily in the consumer's name. The savings account may belong to a child, a spouse, or a parent of the consumer. Indeed, the benefited savings account may even belong to some third party, such as a church or a charity that is favored by the consumer.

Instead of (or in addition to) an incremental savings agreement with the card issuer, the consumer may have a similar agreement with the merchant. When the merchant submits the transaction for authorization, a savings portion is added by the merchant to the merchandise charge, and the total is submitted. When the merchant receives payment, the merchant automatically forwards the savings fund portion of the payment to the specified savings account on behalf of the consumer.

To further illustrate the invention, several examples are provided below in connection with credit card transactions. This is done with the understanding that similar embodiments using other consumer-initiated transactions are also within the scope of the invention. Dollars are used in the examples, but other currencies may also be used according to the invention, including currencies supported by other national governments and/or electronic currencies such as the beenz currency described at www.beenz.com. Also, the amounts and percentages given here are merely illustrative; other numbers may also be used in particular embodiments. Other scenarios may also be performed according to the invention; the specific examples below are not meant to be comprehensive.

EXAMPLE 1

Consumer C enters a savings agreement with credit card issuer (bank, credit union, merchant, etc.) CI whereby for each $100 that would otherwise be charged to the card in the absence of the savings agreement, CI will bill C for $107. Of the specified $7, on payment $0.25 will be kept by CI as a service fee, and $6.75 will be automatically deposited by CI on C's behalf in a specified savings account.

EXAMPLE 2

As in Example 1, but the savings agreement specifies a flat amount per month. For instance, regardless of purchases made by C, the monthly bill from CI will show a charge of $50.00 for "savings set-aside" or the like. Of this amount, $0.50 will be kept by CI as a service fee, and $49.50 will be automatically deposited by CI on C's behalf in a specified savings account.

EXAMPLE 3

As in the other Examples, but the specified amount is divided between two or more specified savings accounts.

EXAMPLE 4

As in the other Examples, but C has the option of not immediately paying the specified amount (e.g., $7 in Example 1) without thereafter being charged the interest that is normally applied by CI toward funds for (other) purchases made with the card. That is, C can opt out of the savings any given month without any penalty. In some embodiments, the opt-out is limited, e.g., to some maximum number or some amount.

In other cases, where interest on specified amounts is charged, the interest may be allocated in various ways to C and CI, with all of it going to C in some cases, all going to CI in others, and the interest payment split between C and CI in still others.

Some Definitions

For convenience, some of the terms used in this document are defined here. However, these definitions must be viewed in the context of the entire document, and these and other terms are defined at least in part by examples given throughout this document.

"Financial institutions" include at least banks, credit unions, credit card companies, brokerage houses, and other organizations which are subject to banking and/or securities laws and/or regulations. n particular, credit cards, smart cards, checking accounts, and the like are issued by financial institutions. Likewise, savings accounts, certificates of deposit, mutual funds, and other savings vehicles are provided by financial institutions. "Merchants" in general are not necessarily financial institutions.

"Savings vehicles" include at least savings accounts, mutual funds, certificates of deposit, money-market accounts, and other investment accounts. Savings vehicles hold cash, cash equivalents, or other negotiable instruments or negotiable assets such as stock shares or bonds. They may be taxable, tax-deferred, or tax-free n some embodiments, savings vehicles include mortgages, lines of credit, consumer loans, and similar accounts.

"Electronic transactions" include credit card transactions, smart card transactions, electronic check transactions, electronic currency transactions, electronic funds transfers, and other transactions in which monetary assets are transferred with the aid of a stand-alone and/or networked computing device or computing system. The transactions contemplated under the invention include at least electronic transactions and cash transactions.

"Card" includes at least one or more of a credit card, charge card, prepaid card, smart card, debit card, automatic teller machine ("ATM") card, and bank card.

Systems and More

Figure 1:
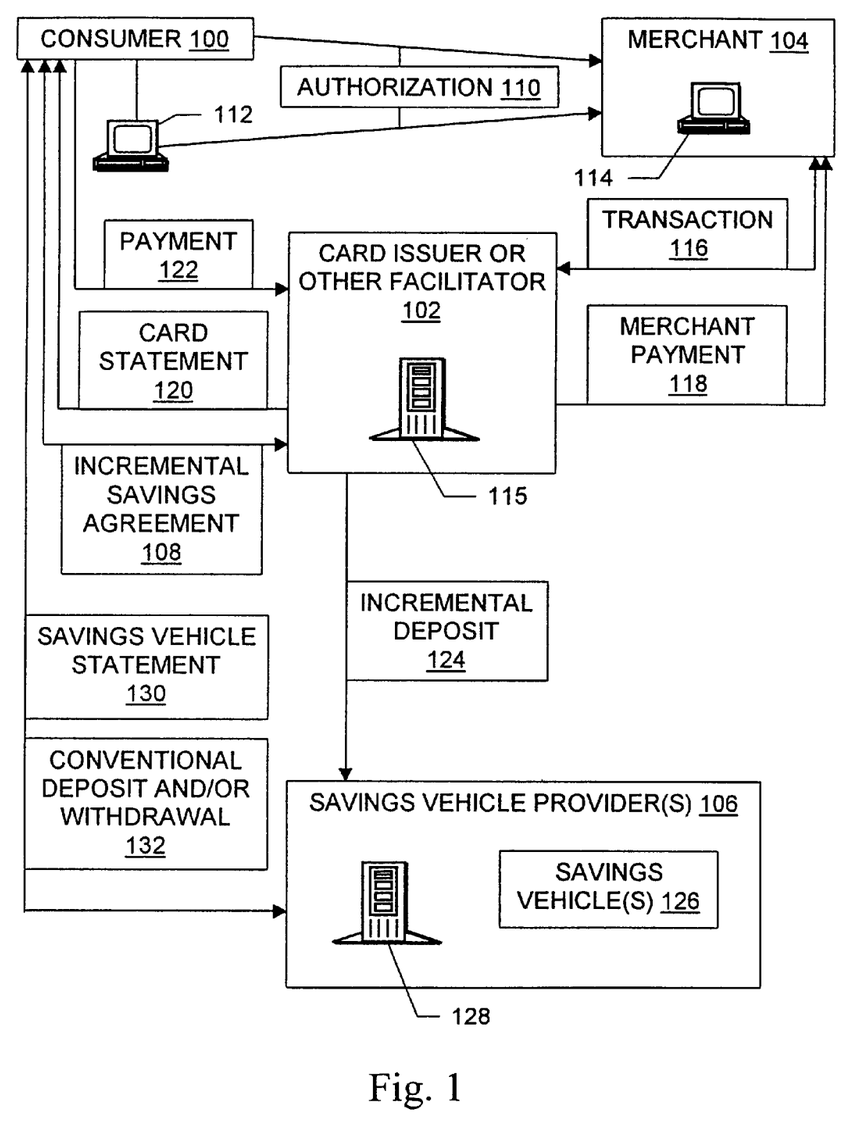
FIG. 1 is a diagram illustrating a distributed computing system in an incremental savings infrastructure according to the present invention, including an incremental savings agreement between a consumer and a card issuer or other facilitator.
Figure 2:
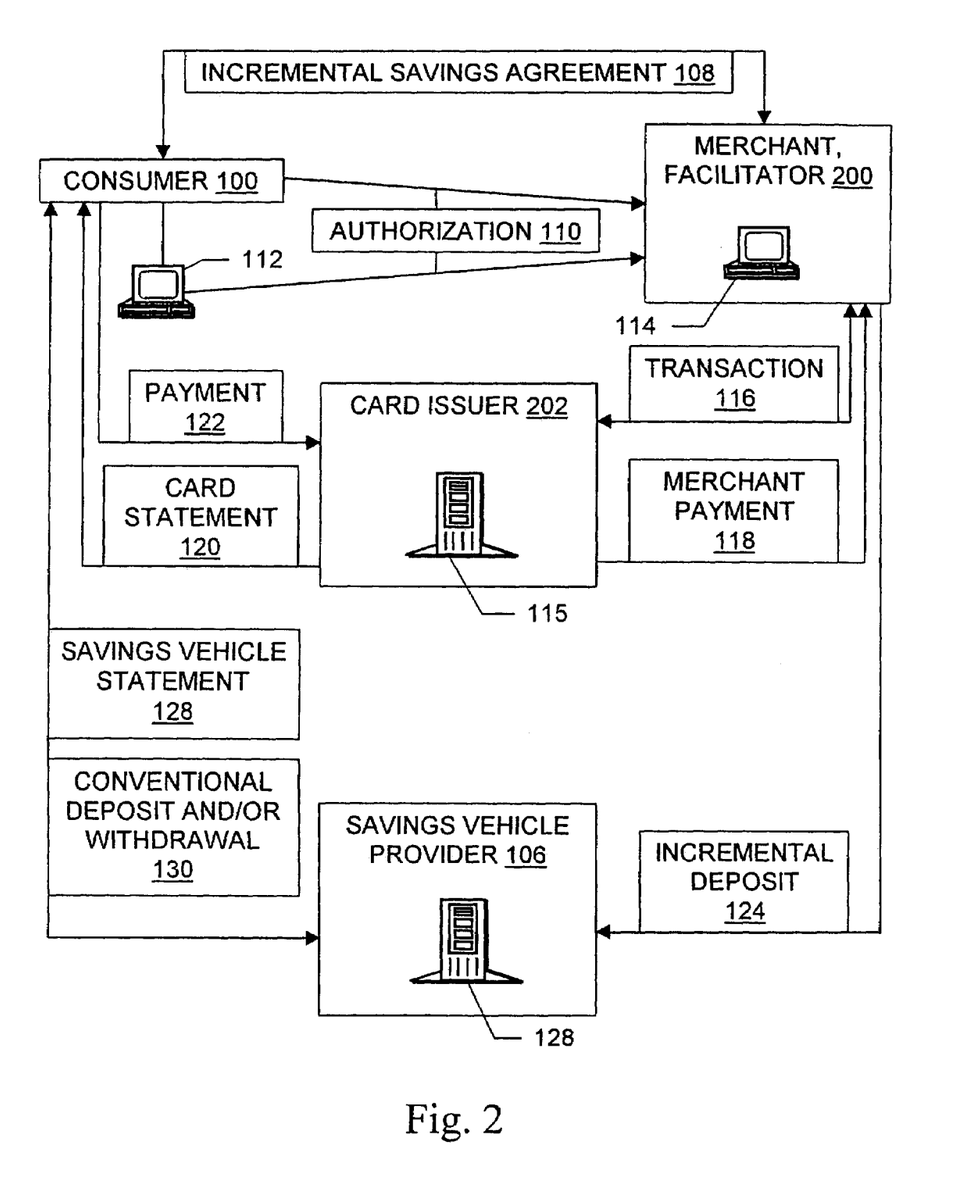
FIG. 2 is a diagram illustrating a distributed computing system in an incremental savings infrastructure according to the present invention, including an incremental savings agreement between a consumer and a merchant who is also a facilitator.
Figure 3:
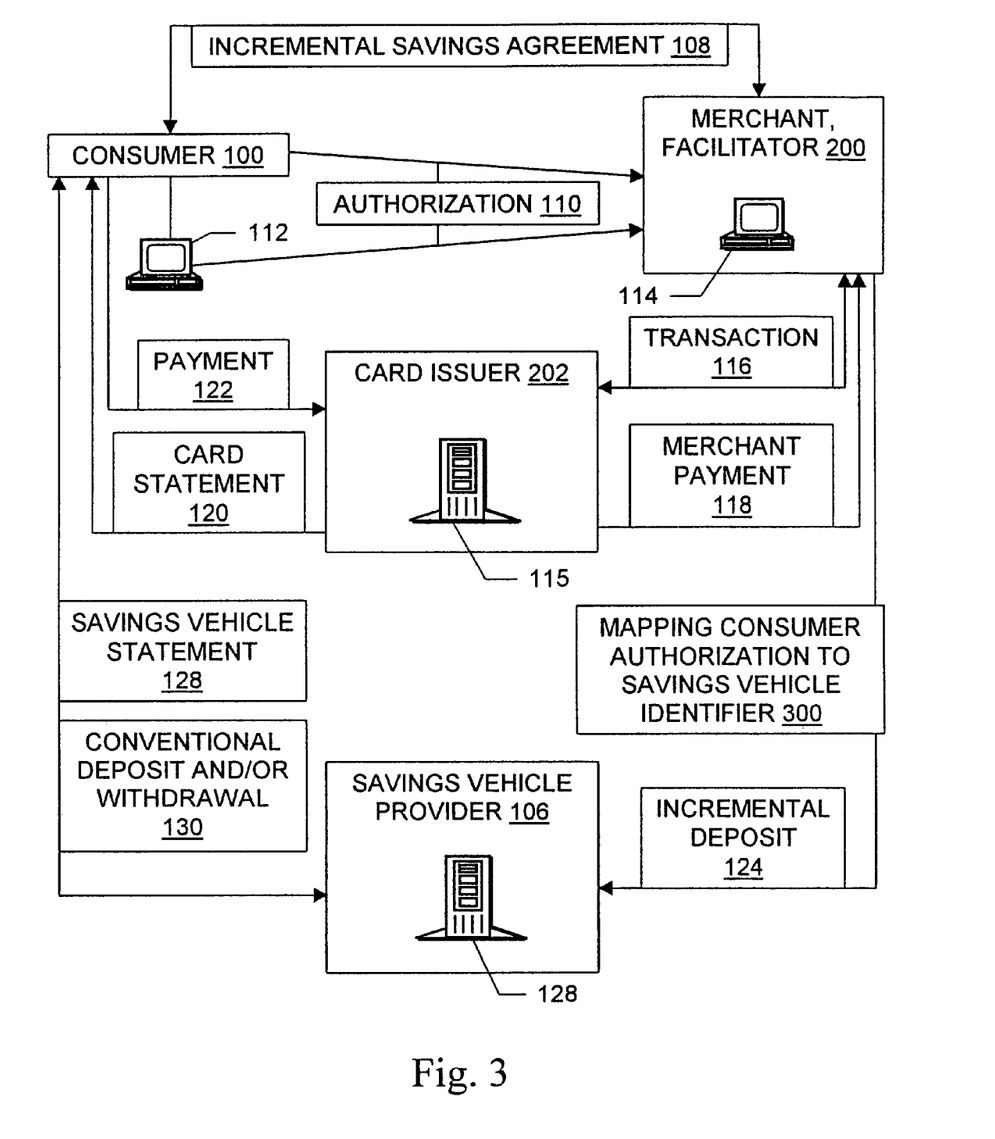
FIG. 3 is a diagram illustrating a distributed computing system in an incremental savings infrastructure as shown in FIG. 2, with an authorization-to-savings-vehicle mapping highlighted.

FIGS. 1 through 3 illustrate systems according to the invention. These Figures also help illustrate methods of the invention, and other embodiments such as articles, signals, and configured storage media. To reduce repetition, discussions herein of inventive systems will also be understood by those of skill in the art to shed light on the methods and other embodiments of the invention. Likewise, discussions of methods, articles, signals, and so on also help explain the inventive systems.

FIG. 1 illustrates a distributed computing system in an incremental savings infrastructure according to the present invention. The principal roles served by the infrastructure are filled by a consumer 100, a card issuer or other facilitator 102, a merchant 104, and a savings vehicle provider 106. The consumer 100 may be an individual person, or it may be a business entity, such as a partnership, limited liability company, corporation, foundation, trust, or other legal person that is capable of entering a binding contractual agreement to promote consumer savings. The card issuer 102 or other facilitator is generally a financial institution n situations where the facilitator 102 is a card issuer, the card it issued to the consumer 100 may be a credit card, charge card, prepaid card, smart card, or other "card" as defined herein. nstead of issuing a card (or in addition thereto) the facilitator 102 may provide the consumer 100 with a checking account, line of credit, or other means of authorizing purchases. The merchant 104 may be any vendor of goods and/or services. The savings vehicle provider 106 is a financial institution which provides controlled access to one or more savings vehicles. The illustrated savings vehicle provider 106 and facilitator 102 are legally distinct entities.

The consumer 100 and the facilitator 102 are parties to a legal incremental savings agreement 108. The savings agreement 108 helps promote savings as a beneficial side-effect of consumer financial activities that are primarily directed at other goals, such as purchasing goods or services from merchants, or paying bills. The savings agreement 108 is discussed in greater detail in connection with FIG. 4. At this point, it is sufficient to note that under the savings agreement 108 funds will be directed on the consumer's behalf to a savings vehicle 126 at the financial institution 106 in response to at least one otherwise unrelated consumer-initiated transaction using the card or other authority issued to the consumer 100 by the facilitator 102.

n operation, one scenario according to the invention proceeds as follows. The consumer 100 provides an authorization 110 to the merchant 104 to purchase goods, purchase services, pay an outstanding balance, or the like. As used herein, "purchase" may include outright purchases as well as rentals, leases, and so on. The authorization 110 includes a credit card number, smart card identifier (possibly including digital signatures and/or keys), checking account number, or other means identifying the source of authority subsequently cited by the merchant 104. That is, the authorization 110 provides the merchant 104 with an authorization to transfer funds from the consumer 100.

The authorization 110 may be provided by the consumer in person, by telephone, by fax, through a non-secure or secure world wide web or email communication, or by other familiar means n particular, as indicated in FIG. 1 the authorization 110 may be provided without any intervening consumer computing activity, or it may be provided by way of a computer 112 that is controlled by the consumer 100. The authorization 110 may be limited to an authorization to add the savings funds to the merchandise costs, so the present invention can be used even if the consumer 100 pays the merchant in cash.

When the consumer pays the merchant electronically, the merchant will generally use its own computing system 114 to verify the authorization 110. For instance, a credit card transaction 116 typically involves communications between the computing system 114 and a computing system 115 that is controlled by the credit card issuer 102. n general, the card issuer 102 verifies the authorization 110 and pays the merchant 118. n practice, credit card payments may be performed as shown or differently, but conventional tools and techniques for handling credit card, smart card, and other "card" payments my be readily adapted for use according to the present invention.

In many cases, the transaction 116 will include a request from the merchant 104 only for the cost of the goods and/or services being provided by the merchant 104 to the consumer 100 (including any applicable shipping charges, insurance, taxes or duties, and so on), as in conventional situations. To promote incremental savings by the consumer 100, the facilitator 102 will internally add a savings fund amount. Thus, a statement 120 sent to the consumer 100 will show charges for both the merchandise and the proposed savings deposit.

On receiving payment 122 of all charges, the facilitator 102 transfers a savings deposit 124 in the specified amount to the savings vehicle provider 106 to deposit in the specified savings vehicle(s) 126. This may be accomplished using an electronic funds transfer effected between the computing systems 115, 128 of the two institutions 102, 106, or by other familiar means for making a deposit to a specified account of another party. If a partial payment 122 is received, the funds may be allocated between the merchandise charges and the incremental savings charges (possibly including facilitator 102 fees) in various ways, as set forth in the savings agreement 108. Likewise, interest may or may not be charged on unpaid incremental savings charges, as agreed by the facilitator 102 and the consumer 100 and pursuant to any applicable laws or regulations.

If the savings vehicle is owned or managed by the consumer 100, then the consumer 100 typically receives a periodic statement 130 summarizing account activity during the past period. This statement 130 will reflect the incremental deposit(s) 124, and the consumer 100 will thus see specific savings benefits as a result of the invention. If someone other than the consumer 100 owns or manages the benefited savings vehicle, then that person or entity will receive a statement like the statement 130. Finally, note that conventional deposit tools and techniques 132 are compatible with the present invention, as are conventional withdrawals 132. Of course, if the consumer 100 does not own or manage the benefited savings vehicle, then the consumer 100 will typically be unable to make withdrawals.

In some cases, an initial communication in the transaction 116 from the merchant 104 will include only the cost of the goods and/or services being provided by the merchant 104 to the consumer 100, but the facilitator 102 will authorize a larger amount by adding a charge for a proposed savings fund deposit. The addition is made pursuant to the savings agreement 108 between the consumer 100 and the facilitator 102. This approach allows the consumer 100 to see the information about the proposed deposit 124 at the time of the consumer's interaction with the merchant 104. In some embodiments, the system also allows the consumer 100 to cancel the proposed deposit direction at that time.

In some cases, the transaction 116 will include a request from a merchant both for the cost of the goods and/or services being provided by the merchant to the consumer 100 and for a proposed savings fund deposit. This may occur, for instance, in situations like those shown in FIGS. 2 and 3, in which the consumer 100 has an incremental savings agreement 108 with a merchant who is also (by virtue of the agreement 108) a facilitator 200. In the illustrated systems, the card issuer 202 is not a facilitator; in alternative embodiments, both the merchant and the card issuer may be party to one or more incremental savings agreements with the consumer 100.

The system shown in FIG. 2 operates generally in the same manner as the system of FIG. 1, but the merchant facilitator 200 submits to the card issuer 202 a transaction 116 request for verification to charge the consumer 100 for both the merchandise and the proposed savings deposit 124. The card issuer 202 does not necessarily know that part of the requested amount will be directed to savings on behalf of the consumer 100. When the merchant facilitator 200 receives payment, it directs the specified amount(s) to the specified savings vehicles, pursuant to the agreement 108, thereby making one or more deposits 124 on behalf of the consumer 100.

The system shown in FIG. 3 operates generally in the same manner as the systems of FIGS. 1 and 2, but includes a separate mapping feature 300 which converts authorization source identifiers (e.g., credit card numbers or smart card identifiers) into corresponding savings vehicle identifiers (e.g., bank name and savings account number). The mapping may be performed using computers configured with one or more lists, trees, databases, tables, and/or other data structures that define correspondences between authorization source identifiers and savings vehicle identifiers.

As a result of the mapping, the merchant facilitator 200 does not necessarily have access to the savings vehicle identifiers. The merchant facilitator 200 simply directs the specified funds to the mapping entity 300 with the authorization source identifier and/or the consumer's identification. Then the mapping entity 300 follows through with the savings vehicle provider 106 to make sure the funds are deposited 124 in the manner specified by the consumer 100 in the agreement 108 with the merchant. A separate incremental savings agreement (not shown) governing the relationship between the consumer 100 and the mapping entity 300 provides the mapping entity 300 with the necessary savings vehicle identifier(s).

The mapping entity 300 may be a separate entity, or it may be part of the savings vehicle provider 106. The mapping entity 300 may be a financial institution, or it may be some other trusted entity. Use of the mapping entity 300 makes it possible for the consumer 100 to enter incremental savings agreements 108 with merchants and others without thereby disclosing to them who will benefit from the savings that are deposited 124 pursuant to those agreements 108.

For convenience, the discussion above assumes a one-to-one correspondence between transactions 116 and incremental deposits 124. This is perhaps the most immediately beneficial way to direct funds to savings incrementally and automatically. In particular, unlike the Discover® card end-of-year reward approach or the Principal VISA card threshold approach, this one-deposit-per-covered-transaction approach puts the savings funds to work on behalf of the savings vehicle owner very quickly after the funds are released by the consumer 100, and it does so regardless of other transactions 116. However, in particular embodiments the invention may also use an end-of-year or other periodic approach, a threshold approach, a flat monthly deposit amount, or an approach in which one of the foregoing is a default that can be overridden by the consumer 100 on a per-transaction basis. Floors and/or ceilings specifying minimum and/or maximum savings deposits 124 in a given period may also be set forth in the agreement 108.

Finally, note that distributed computing systems according to the invention may include one or more computers or other computing devices shown in FIGS. 1 through 3, such as the consumer computer 112, merchant point-of-sale system 114, card issuer transaction handling system 115, and financial institution accounting system 128, as well as networking hardware and/or software that connects such computers. The incremental savings infrastructure of the invention includes such a distributed computing system and/or other illustrated components. In particular, embodiments of the infrastructure include one or more incremental savings agreement 108.

System components may be repeated, omitted, named differently, grouped differently, and/or connected differently than shown in the illustration, in manners which are consistent with the appended claims and the understanding of those of skill in the pertinent art(s).

Incremental Savings Agreement

Figure 4:
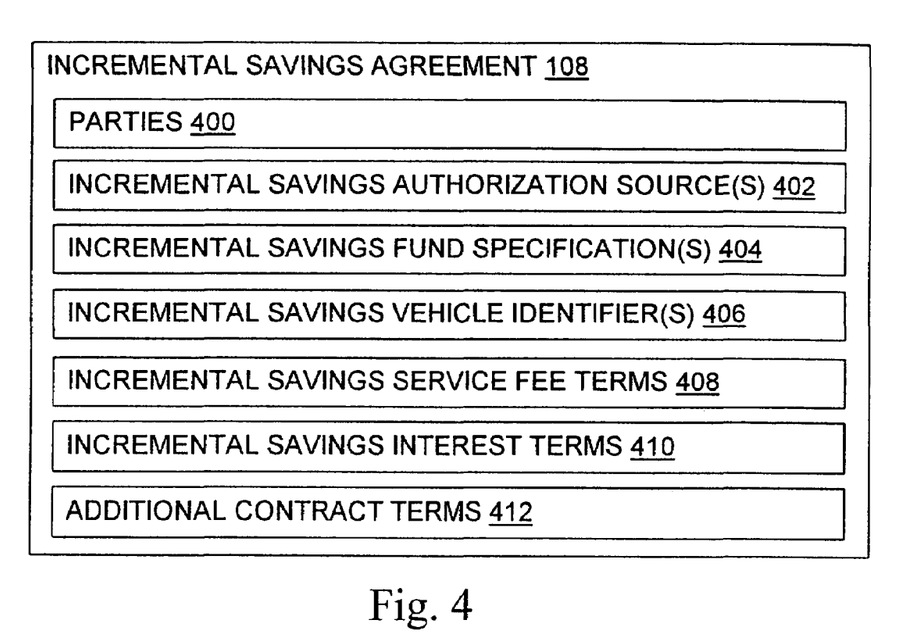
FIG. 4 is a diagram illustrating an incremental savings agreement according to the present invention.

An incremental savings agreement 108 according to the invention is illustrated generally in FIG. 4. The agreement 108 may be embodied in paper, electronic, or other form. In electronic embodiments, the agreement 108 may reside in volatile or non-volatile computer memory and/or as a signal embodied in a network connection of the distributed computing system. The agreement 108 may be characterized as a data structure, and the possible electronic embodiments include general-purpose computer memory configured in a new way by word processor, database, and/or other data structures which provide useful and concrete benefits by promoting savings as discussed herein. In paper or electronic form, the agreement 108 may be characterized as a novel article of manufacture which both relies on contract law and merits protection under patent law. Other characterizations may also be pertinent.

In the illustrated agreement 108, a parties component 400 identifies the parties to the agreement 108. As discussed above, the consumer 100 will be one party, and the other party (or parties) will include one or more facilitators 102 and/or 200. The parties are specified in a legally binding manner, in conformance with generally recognized principles of contract law. In particular and without limitation, the parties component 400 normally includes signature(s) and/or other indicia of the parties' intent to be bound by the agreement 108 under applicable law.

An incremental savings authorization source component 402 specifies one or more credit card numbers, smart card identifiers, checking account numbers, or other authorization sources. Pursuant to the agreement 108, when the consumer 100 performs a transaction involving a specified authorization source, incremental funds will be directed to savings as discussed herein. In some cases, incremental funds may be directed to savings for every transaction of the consumer 100 that is known to the other party 400. In effect, all of the consumer's credit card numbers and the like (at least, all of those the consumer 100 subsequently uses in a manner known to the facilitator) are specified in the authorization source component 402.

An incremental savings fund specification component 404 specifies the relationship between consumer 100 transactions 116 and direct deposits 124. For instance, the amount deposited may be a fixed amount per transaction 116, or a percentage of the size of the transaction 116. As noted, annual, threshold, fixed-monthly, one-deposit-per-covered-transaction, or other approaches may be used to specify when the funds that are set aside for savings are actually sent to the savings vehicle provider 106, and the transfer amounts may be subject to floors, ceilings, or other conditions precedent or otherwise.

An incremental savings vehicle identifier component 406 specifies one or more savings vehicles 126 to receive the incremental deposits 124. For instance, the account number, bank routing number, and similar information for each savings vehicle 126 may be listed. If a mapping entity 300 is used, then the mapping entity 300 may be identified instead of listing account numbers. The identification of particular savings vehicles 126 will then be given to the mapping entity 300 in a separate document, possibly together with the credit card numbers, smart card identifiers, or other identifiers listed in the authorization source 402.

In some embodiments, savings vehicles 126 include mortgages, lines of credit, loans, and similar accounts. For instance, some creditors, loan providers, and/or guarantors may require the consumer 100 in its role as a debtor to enter an incremental savings agreement 108 to reduce the consumer's debt. Under such an incremental savings agreement, a specified amount is directed to a savings vehicle to repay a loan, or to secure a credit card or other line of credit, each time the consumer 100 makes an otherwise unrelated transaction 116 covered by the agreement.

An incremental savings service fee terms component 408 specifies the legal terms and conditions under which the facilitator is compensated for providing the incremental savings service to the consumer 100. Fees may be specified as a percentage of the savings amount, or as a flat amount per transaction, for instance. In some cases, the fees may be waived, as during an initial trial period, for instance. In some cases, no facilitation fees are assessed, as when the facilitator is compensated through other means, such as interest on unpaid balances or general annual card fees.

An incremental savings interest terms component 410 specifies the legal terms and conditions under which the consumer 100 earns and/or incurs interest on the savings funds. For instance, in some cases the consumer may earn interest on funds that have been received by the facilitator (e.g., payment 122 was made in full for both merchandise and for savings) but have not yet been deposited with the savings vehicle provider 124. In some cases, the consumer may incur interest obligations to the facilitator on unpaid savings amounts, that is, amounts billed 120 but not yet paid 122.

A component 412 includes additional contract terms, which are generally familiar to those of skill in the art. Selection of appropriate terms will often be guided by general principles of contract law, securities and/or banking laws and/or regulations, and by particular business circumstances. Suitable examples to consider for inclusion in a specific agreement 108 may include, for instance, provisions that state the intended duration of the agreement 108, address termination of the agreement 108, provide representations and warranties by the parties to the agreement 108, and/or address other issues such as indemnification, insurance, remedies, jurisdiction, venue, governing law, dispute resolution, arbitration, notice to the other parties, confidentiality, assignment of the agreement 108, non-waiver, integration, modification of the agreement 108, force majeure, and severability.

Familiar security tools and techniques should be used to safeguard the privacy and integrity of the information provided in the agreement 108, and to prevent fraud. This is particularly true of credit card numbers and similar authorization sources 402.

Incremental savings agreement components may be repeated, omitted, named differently, grouped differently, and/or ordered differently than shown in the illustration, in manners which are consistent with the claims and the understanding of those of skill in the pertinent art(s).

Methods

Figure 5:
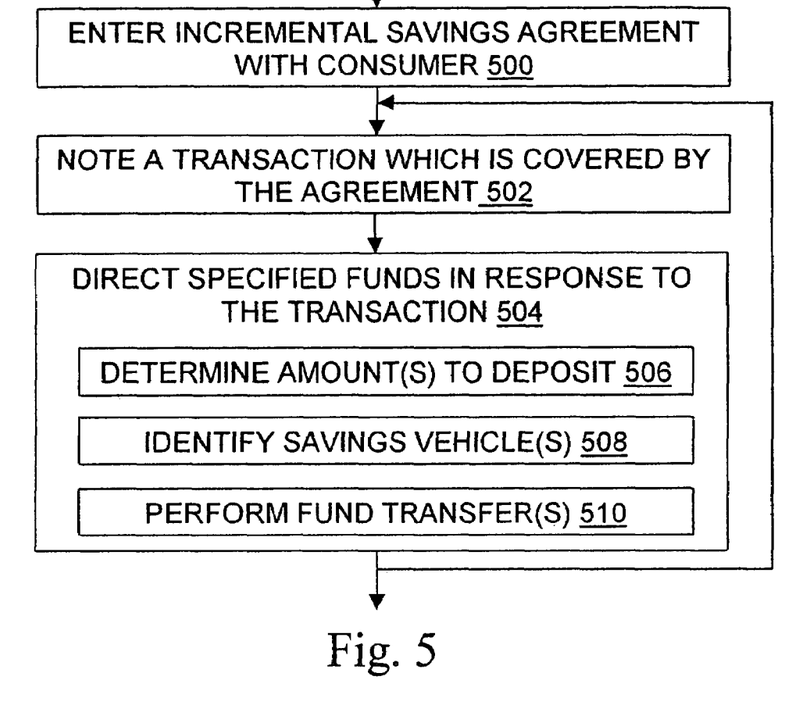
FIG. 5 is a flowchart illustrating methods of the present invention from the perspective of a financial institution or other facilitator.
Figure 6:
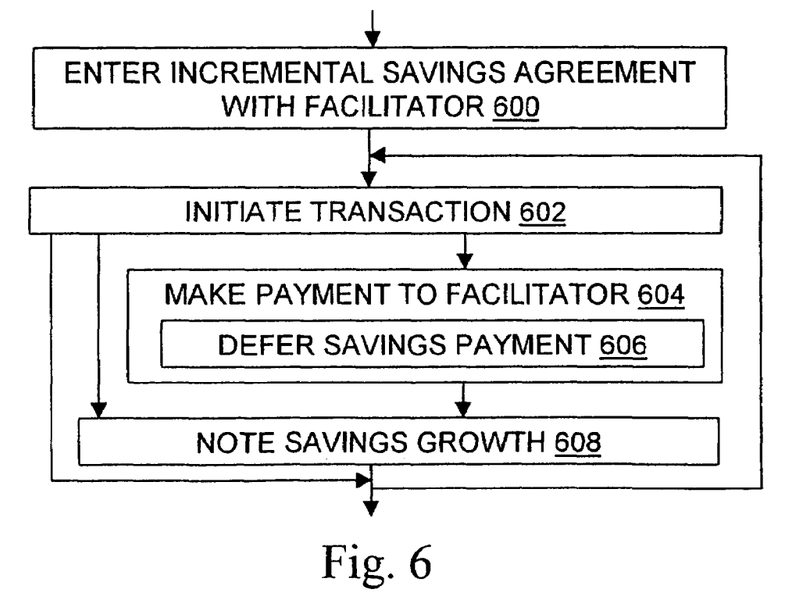
FIG. 6 is a flowchart illustrating methods of the present invention from the perspective of a consumer.

FIGS. 5 and 6 illustrate methods of the present invention. In particular, FIG. 5 shows steps of the invention from the perspective of a facilitator 102 or 200. The invention provides a method of facilitating savings by providing between the consumer 100 and at least one financial institution 106 an infrastructure for incremental savings by the consumer 100.

During an entering step 500, the facilitator enters an incremental savings agreement (such as the illustrated agreement 108) with the consumer 100. That is, a legally binding agreement is formed, with the facilitator and the consumer 100 as parties. The entering step may be performed, for instance, by a credit card issuer 102 in connection with a credit card the issuer 102 issues to the consumer 100, or by a merchant facilitator 200.

Under the agreement, funds will be directed to a savings vehicle at the financial institution 106 on behalf of the consumer, incrementally and automatically (i.e., without requiring consumer intervention for each deposit) as described herein, in response to covered transactions. The financial institution 106 is not necessarily a party to the agreement between the consumer and the facilitator. However, other facilitators, other consumers, one or more financial institutions 106, and/or mapping entities 300 may be parties to a particular incremental savings agreement.

During a noting step 502, the facilitator notes a transaction which is covered by the agreement. In general, transactions covered by an incremental savings agreement of the type described herein are consumer-initiated transactions that are specified in the agreement and otherwise unrelated to the savings vehicle. For instance, conventional savings vehicle deposits are not considered transactions under the incremental savings agreement.

As noted elsewhere herein, the agreement may implicitly cover all transactions by the consumer 100 which come to the facilitator's attention, or it may be limited to a certain credit card, a certain smart card, and so on. The scope of covered transactions may also be limited according to the time period in which a candidate transaction occurs (e.g., "only direct funds to savings during July"), limited according to transaction amount (e.g., "only direct funds if the total merchandise charge exceeds $200"), or constrained in other ways.

During a directing step 504, funds are directed to savings according to the terms of the incremental savings agreement. That is, specified funds are set aside and/or transferred on the consumer's behalf to the specified savings vehicle at the financial institution 106 (possibly by way of the mapping entity 300), pursuant to the terms of the agreement, in response to at least one consumer-initiated transaction. Each directing step includes one or more of the illustrated steps 506, 508, 510.

An amount determining step 506 determines the amount of funds to direct to savings. As noted, the amount may be a percentage of the merchandise cost, a flat amount per transaction, or it may be calculated according to other criteria set forth in the incremental savings agreement or in an agreement with a mapping entity 300.

A vehicle identifying step 508 identifies one or more savings vehicles to (ultimately) receive the calculated fund amounts. The savings vehicle(s) may be identified explicitly by listing account numbers or the like, or the vehicle(s) may be identified implicitly by identifying the mapping entity 300.

A fund transferring step 510 performs the actual transfer of funds from the facilitator to either the savings vehicle provider 106 or the mapping entity 300; if the transfer is to the mapping entity 300, then the mapping entity 300 will finish transferring the funds 124 to the savings vehicle(s) 126. As noted, a periodic procedure, a threshold procedure, a one-deposit-per-transaction procedure, or some other procedure can be used to determine when specified funds are actually transferred.

FIG. 6 shows steps of the invention from the perspective of the consumer 100. During an entering step 600, the consumer 100 enters an incremental savings agreement, such as the illustrated agreement108, with a facilitator 102 or 200. For instance, when the facilitator is a first financial institution, the incremental savings agreement may require that specified funds be directed on the consumer's behalf to a specified savings vehicle 126 at a second financial institution 106 in response to at least one otherwise unrelated consumer-initiated transaction.

The incremental savings agreement may be part of a larger agreement which also addresses other aspects of the consumer-facilitator relationship, such as a standard service agreement between a consumer and a credit card issuer, bank, or brokerage firm. It should also be understood that a given consumer 100 may enter incremental savings agreements with several different facilitators, on the same or somewhat different terms and conditions.

During an initiating step 602, the consumer initiates a transaction which is covered by the agreement. For instance, the consumer 100 may submit a credit card number or a smart card identifier to a merchant to purchase some merchandise, using a card specified in the incremental savings agreement 108. For convenience, reference is often made herein to "merchandise" but it should be understood that purchasing or paying for services (other than conventional savings vehicle deposit services) may also be a transaction 116 covered by an incremental savings agreement.

In some cases, the consumer 100 will then make 604 a payment to the facilitator, apart from any payment made during the covered transaction. For instance, the facilitator may be a credit card issuer, and the consumer 100 may make a payment 122 after receiving the monthly bill 120. As noted, some incremental savings agreements permit the consumer 100 to defer 606 payment of the specified savings funds, so the consumer 100 payment 122 includes funds only for the merchandise. In other cases, the facilitator is paid during the transaction, as may occur when the consumer transacts business with a facilitator merchant in a system of the kind shown in FIG. 2 or FIG. 3.

If the savings vehicle to which funds are directed under the agreement is owned or managed by the consumer 100, then the consumer 100 typically receives an account activity statement 130, allowing the consumer 100 to note 608 the growth of the savings vehicle funds 126 as a result (at least in part) of the novel incremental deposits 124. Even if the consumer does not own or manage the benefited savings vehicle, step 608 may occur. For instance, a church or charitable organization may send the consumer 100 and other contributors a note or letter thanking them for their contributions to its funds. In some cases, this document may also serve as a receipt for tax purposes.

Method steps may be repeated, omitted, named differently, grouped differently, and/or ordered differently than shown in the illustration, in manners which are consistent with the claims and with the understanding of those of skill in the pertinent art(s).

Signals

Figure 7:
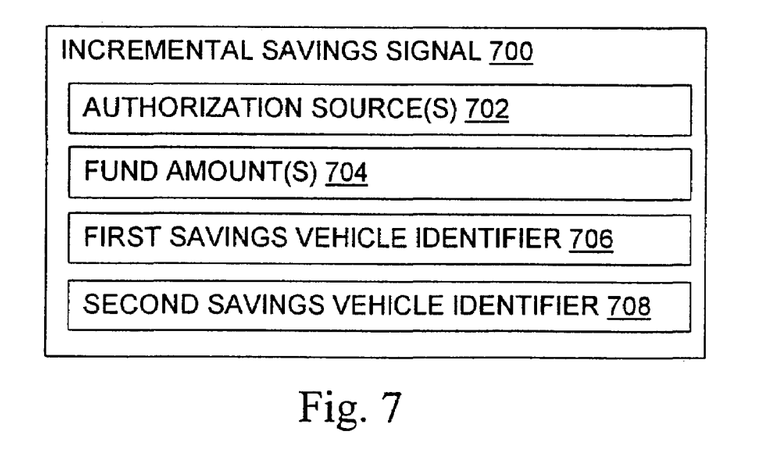
FIG. 7 is a diagram illustrating an incremental savings signal according to the present invention.

FIG. 7 illustrates incremental savings signals 700 according to the invention. A given signal 700 may be embodied in a distributed computing system such as the systems illustrated in FIGS. 1 through 3, in the system's computer memory and/or network connections. The illustrated signal 700 includes one or more authorization sources 702, such as a credit card number, charge card number, smart card identifier, other card identifier, and/or checking account number. The illustrated signal 700 also includes one or more fund amounts for funds directed to savings vehicle(s) as described herein.

In addition, the illustrated signal 700 includes a first savings vehicle identifier 706 identifying a first savings vehicle to receive funds in response to the transaction 1116, and a second savings vehicle identifier 708 identifying a second savings vehicle to receive funds in response to the transaction 116. Other incremental savings signals include one or more additional (third, fourth, etc.) savings vehicle identifiers.

In either case, suitable savings vehicle identifiers include a savings account number; a tax-deferred savings account number for an IRA, KEOGH, 401(k), or like account; a trust fund account number; a mutual fund account number; a money market account number; a certificate of deposit number; or the like. The savings vehicle identifiers may also include bank routing numbers, bank names and addresses, and other information for locating the savings vehicle so a deposit 124 can be made. The savings vehicle identifiers may identify savings vehicles 126 at two or more different financial institutions 106; a single financial institution 106 is shown in the Figures merely to promote the clarity of those illustrations, not to limit the invention.

In some incremental savings signals, the funds amount 704 is a first funds amount and the signal further includes a second funds amount. The first savings vehicle is identified to receive the first funds amount, and the second savings vehicle is identified to receive the second funds amount. This may occur, for example, when two savings vehicles 126 will each receive a different amount as a beneficial side-effect of the transaction 116.

An alternate incremental savings signal includes an authorization source 702 for a transaction 116, a funds amount 704, and a mapping entity 300 identifier identifying a mapping entity 300 that will map the authorization source to at least one savings vehicle identifier. Thus, the savings vehicle identifiers 706, 708 need not be present in this alternate signal.

Like other incremental savings signals, this alternate incremental savings signal may be embodied in a distributed computing system in computer memory (volatile and/or non-volatile) and/or in the network "wires" of the distributed computing system. The network may include twisted pair, coaxial, or optical fiber cables, telephone lines, satellites, microwave relays, modulated AC power lines, and/or other data transmission "wires" known to those of skill in the art.

Signal components may be repeated, omitted, named differently, grouped differently, and/or ordered differently than shown in the illustration, in manners which are consistent with the claims and the understanding of those of skill in the pertinent art(s). They may be supplemented with timestamps, checksums, digital signatures, and other components using familiar tools and techniques.

Configured Storage Media

The methods of the invention may be embodied in configured computer-readable storage media. Suitable storage media may include a magnetic, optical, or other computer-readable storage device having a specific physical substrate configuration. Suitable storage devices include floppy disks, hard disks, Iomega ZIP disks, tape, CD-ROMs, PROMs, RAM, and other computer system storage devices. The substrate configuration represents data and instructions which cause the computer system to operate in a specific and pre-defined manner as described herein. Thus, the configured medium tangibly embodies a program, functions, and/or instructions that are executable by one or more computers or other computing devices to perform savings facilitation steps of the present invention substantially as described herein.

Summary

The invention helps overcome the psychological barriers to savings, felt by at least some people, by making available a legal and technological infrastructure which makes possible a new form of automatic and incremental commitments to savings. Funds are set aside in connection with consumer-initiated actions like credit card purchases, which are primarily directed at a goal other than savings. For instance, the primary goal may be to buy some appliance, clothing, food, vehicle, or other desired consumer goods. But the savings set-aside can be an additional perceived benefit.

The invention may be implemented using legal agreements; electronic funds transfer tools and techniques; computer software, hardware, and networks; and other tools and techniques. Many conventional tools and techniques can be adapted for use according to the invention, such as those conventionally used to manage credit card accounts, funds transfers, inquiries from credit card holders, and so on.

Although particular methods (FIGS. 5, 6), signal formats (FIG. 7), systems (FIGS. 1-3), and articles (FIG. 4) embodying the present invention are expressly illustrated and described herein, it will be appreciated that systems and configured medium embodiments may be formed according to the signals, articles, and methods of the present invention. Unless otherwise expressly indicted, the description herein of one category (system, method, article, signal, configured medium) of embodiment of the present invention therefore extends to corresponding embodiments in other categories.

As used herein, terms such as "a" and "the" and other designations are inclusive. In particular, in the claims a reference to an item or a step means at least one such element is required, notwithstanding any express reference elsewhere to "at least one" element. When exactly one element is intended, this document will state that requirement expressly.

The invention may be embodied in other specific forms without departing from its essential characteristics. The described embodiments are to be considered in all respects only as illustrative and not restrictive. Headings are for convenience only. Any explanations provided herein of the principals employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for facilitating consumer savings, comprising the computer-assisted steps of:

operating a computing device of a financial institution to enter into a savings agreement, the computing device of the financial institution storing the information defining the savings agreement, wherein the savings agreement (a) is between a consumer and the financial institution and (b) sets terms for depositing specified funds into a savings vehicle at the financial institution in response to a consumer-initiated transaction for purchasing a good or a service;

transmitting information from a merchant computer system to the computing device of the financial institution that a consumer has initiated a transaction;

receiving information at the computing device of the financial institution from the merchant computer system that the consumer has initiated the transaction;

determining at the computing device of the financial institution that the consumer-initiated transaction is a covered transaction based on the stored information defining the savings agreement;

transmitting information from the computing device of the financial institution to the merchant computer system that the consumer-initiated transaction is a covered transaction;

receiving information at the merchant computer system from the computing device of the financial institution (a) indicating that the consumer-initiated transaction is a covered transaction pursuant to the savings agreement with the consumer for depositing specified funds and (b) regarding the terms of the savings agreement;

wherein:

covered transactions pursuant to the agreement are determined by the computing device of the financial institution according to at least one of the time at which a transaction occurs and the transaction amount, and the specified funds comprise a deposit amount that the consumer has agreed to deposit under the terms of the savings agreement for the consumer-initiated transaction; and automatically directing the specified funds by the merchant computer system on the consumer's behalf to the specified savings vehicle at the financial institution pursuant to the savings agreement.

2. The method of claim 1, further comprising the step of calculating the deposit amount at the merchant computer system at the point of sale based on a percentage of the consumer-initiated transaction.

3. The method of claim 1, further comprising the step of calculating at the merchant computer system a service charge to be paid to at least one financial institution for processing the specified funds by crediting the deposit amount to the savings vehicle.

4. The method of claim 1, wherein the consumer-initiated transaction comprises debiting a debit card.

5. The method of claim 1, wherein the consumer-initiated transaction comprises charging a credit card.

6. The method of claim 1, wherein the deposit amount is a predetermined monetary amount determined by the savings agreement.

7. The method of claim 1, wherein the deposit amount is a non-predetermined monetary amount determined by the savings agreement.

8. The method of claim 1, further comprising the step of calculating the deposit amount as a monetary amount based on a predetermined percentage of the consumer-initiated transaction.

9. The method of claim 1, wherein the merchant computer system reduces the deposit amount by a service charge.

10. A method for facilitating consumer savings, comprising the computer-assisted steps of:

operating a computing device of a financial institution to enter into a savings agreement, the computing device of the financial institution storing and transmitting to a creditor computer system the information defining the savings agreement, wherein the savings agreement (a) is between a consumer and the financial institution and (b) sets terms for depositing specified funds into a savings vehicle at the financial institution in response to a consumer-initiated transaction for purchasing a good or a service;

transmitting information from a merchant computer system to the creditor computer system that a consumer has initiated a transaction;

receiving information at the creditor computer system from the merchant computer system that the consumer has initiated the transaction;

determining at the creditor computer system that the consumer-initiated transaction is a covered transaction based on the information received from the computing device of the financial institution defining the savings agreement;

transmitting information from the creditor computer system to the merchant computer system (a) indicating that the consumer-initiated transaction is a covered transaction pursuant to the savings agreement with the consumer for depositing specified funds and (b) regarding the terms of the savings agreement;

wherein:

covered transactions pursuant to the agreement are determined by the creditor computer system according to at least one of the time at which a transaction occurs and the transaction amount, and the specified funds comprise a deposit amount that the consumer has agreed to deposit under the terms of the savings agreement for the consumer-initiated transaction; and automatically directing the specified funds by the merchant computer system on the consumer's behalf to the specified savings vehicle at the financial institution pursuant to the savings agreement.

11. The method of claim 10, wherein the deposit amount is a predetermined monetary amount determined by the savings agreement.

12. The method of claim 10, wherein the deposit amount is a non-predetermined monetary amount determined by the savings agreement.

13. A method for facilitating consumer savings, comprising the computer-assisted steps of:

operating a computing device of a financial institution to enter into a savings agreement, the computing device of the financial institution storing the information defining the savings agreement, wherein the savings agreement (a) is between a consumer and the financial institution and (b) sets terms for depositing specified funds into a savings vehicle at the financial institution in response to a consumer-initiated transaction for purchasing a good or a service;

transmitting information from a merchant computer system to the computing device of the financial institution that a consumer has initiated a transaction;

receiving information at the computing device of the financial institution from the merchant computer system that the consumer has initiated the transaction;

determining at the computing device of the financial institution that the consumer-initiated transaction is a covered transaction based on the stored information defining the savings agreement;

transmitting information from the computing device of the financial institution to the merchant computer system that the consumer-initiated transaction is a covered transaction;

receiving information at the merchant computer system from the computing device of the financial institution (a) indicating that the consumer-initiated transaction is a covered transaction pursuant to the savings agreement with the consumer for depositing specified funds and (b) regarding the terms of the savings agreement, wherein:

covered transactions pursuant to the agreement are determined by the computing device of the financial institution according to at least one of the time at which a transaction occurs and the transaction amount, and the specified funds comprise a deposit amount that the consumer has agreed to deposit under the terms of the savings agreement for the consumer-initiated transaction; and automatically determining at the merchant computer system the deposit amount at the point of sale based on the received information regarding the terms of the savings agreement.

14. The method of claim 13, wherein the deposit amount is a predetermined monetary amount determined by the savings agreement.

15. The method of claim 13, wherein the deposit amount is a non-predetermined monetary amount determined by the savings agreement.

16. A method for facilitating consumer savings, comprising the computer-assisted steps of:

operating a computing device of a financial institution to enter into a savings agreement, the computing device of the financial institution storing and transmitting to a creditor computer system the information defining the savings agreement, wherein the savings agreement (a) is between a consumer and the financial institution and (b) sets terms for depositing specified funds into a savings vehicle at the financial institution in response to a consumer-initiated transaction for purchasing a good or a service;

transmitting information from a merchant computer system to the creditor computer system that a consumer has initiated a transaction;

receiving information at the creditor computer system from the merchant computer system that the consumer has initiated the transaction;

determining at the creditor computer system that the consumer-initiated transaction is a covered transaction based on the information received from the computing device of the financial institution defining the savings agreement;

transmitting information from the creditor computer system to the merchant computer system that the consumer-initiated transaction is a covered transaction:

receiving information at the merchant computer system (a) indicating that the consumer-initiated transaction is a covered transaction pursuant to the savings agreement with the consumer for depositing specified funds and (b) regarding the terms of the savings agreement;

automatically determining at the merchant computer system the deposit amount at the point of sale based on the received information regarding the terms of the savings agreement; and automatically directing the deposit amount by the merchant computer system on the consumer's behalf to the specified savings vehicle at the financial institution pursuant to the savings agreement.

17. The method of claim 16, wherein the deposit amount is a predetermined monetary amount determined by the savings agreement.

18. The method of claim 16, wherein the deposit amount is a non-predetermined monetary amount determined by the savings agreement.

* * * * *

UNITED STATES PATENT AND TRADEMARK OFFICE
CERTIFICATE OF CORRECTION

PATENT NO. : 7,577,604 B2
APPLICATION NO. : 10/645336
DATED : August 18, 2009
INVENTOR(S) : John W.L. Ogilvie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1461 days.

Signed and Sealed this

Seventh Day of September, 2010

David J. Kappos
*Director of the United States Patent and Trademark Office*